United States Patent
Beck et al.

(10) Patent No.: US 6,494,441 B2
(45) Date of Patent: *Dec. 17, 2002

(54) SELF-PUMPING HYDROPNEUMATIC SPRING STRUT WITH INTERNAL LEVELING

(75) Inventors: Hubert Beck, Eitorf; Bernd Wilms, Hennef; Holger Kirchner, Ruppichteroth, all of (DE)

(73) Assignee: Mannesman Sachs AG, Eitorf (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 67 days.

(21) Appl. No.: 09/427,475

(22) Filed: Oct. 26, 1999

(65) Prior Publication Data

US 2002/0030311 A1 Mar. 14, 2002

(30) Foreign Application Priority Data

Oct. 26, 1998 (DE) .......................................... 198 49 222

(51) Int. Cl.$^7$ .................................................. F16F 5/00
(52) U.S. Cl. .................................. 267/64.16; 267/64.17
(58) Field of Search ............................ 267/64.16, 64.17

(56) References Cited

U.S. PATENT DOCUMENTS

| | | | | |
|---|---|---|---|---|
| 2,756,046 A | * | 7/1956 | Lucien .......................... 267/256 |
| 3,145,985 A | * | 8/1964 | Christian et al. ............ 267/64.17 |
| 3,480,269 A | * | 11/1969 | Jewell et al. ................ 267/64.17 |
| 3,625,540 A | * | 12/1971 | Jewell ........................ 280/6.159 |
| 3,897,940 A | * | 8/1975 | Gele .......................... 267/64.16 |
| 4,720,085 A | * | 1/1988 | Shinbori et al. ............ 267/64.16 |
| 4,753,328 A | * | 6/1988 | Williams et al. ............ 188/266.5 |
| 4,887,515 A | * | 12/1989 | Tabata ............................. 92/80 |
| 4,993,693 A | * | 2/1991 | Lohr et al. .................. 267/64.17 |
| 5,009,400 A | * | 4/1991 | Ott ............................ 267/64.11 |
| 5,058,868 A | * | 10/1991 | Sirven ......................... 267/259 |
| 5,062,616 A | * | 11/1991 | Sommer ..................... 267/64.17 |
| 5,158,267 A | * | 10/1992 | Pascal ........................ 267/64.12 |
| 5,219,152 A | * | 6/1993 | Derrien et al. ............. 267/64.15 |
| 5,342,023 A | * | 8/1994 | Kuriki et al. ............ 280/124.159 |
| 5,465,817 A | * | 11/1995 | Muscatell ..................... 188/295 |
| 5,564,680 A | * | 10/1996 | Sano et al. ................. 267/64.17 |
| 5,586,781 A | * | 12/1996 | Anderson ..................... 280/708 |
| 5,664,649 A | * | 9/1997 | Thompson et al. ........... 188/314 |
| 5,797,594 A | * | 8/1998 | Sekine et al. .............. 267/64.17 |
| 5,826,862 A | * | 10/1998 | Beck .......................... 267/64.17 |
| 5,941,508 A | * | 8/1999 | Murata et al. ............. 267/64.17 |
| 6,092,816 A | * | 7/2000 | Sekine et al. .............. 280/6.159 |

* cited by examiner

Primary Examiner—Matthew C. Graham
Assistant Examiner—Benjamin A. Pezzlo
(74) Attorney, Agent, or Firm—Cohen, Pontani; Lieberman & Pavane

(57) ABSTRACT

A self-pumping hydropneumatic spring strut with internal leveling for motor vehicles includes a working cylinder filled with damping medium. The working cylinder is under the pressure of at least one gas cushion arranged in a high-pressure chamber and acting as a spring. A piston divides the working cylinder into two working spaces and is connected to a hollow piston rod. Valves are arranged on the piston so that the two working spaces are in communiction through the valves. A piston pump is driven by the spring movements and pumps oil out of a low-pressure chamber into the working space connected to the high-pressure chamber and comprises a pump space formed by the hollow piston rod, a pump rod connected to the working cylinder. A further pressure generator acts upon the damping medium in the high-pressure chamber and/or the working space connected to the high-pressure space.

7 Claims, 8 Drawing Sheets

SELF-PUMPING HYDROPNEUMATIC SPRING STRUT WITH INTERNAL LEVELING

BACKGROUND OF THE INVENTION

1. Field of the Invention

The invention relates to a self-pumping hydropneumatic spring strut with internal leveling, in particular for motor vehicles, with a working cylinder which is filled with damping medium under the pressure of at least one gas cushion arranged in a high-pressure chamber and acting as a spring. The working cylinder is divided into two working spaces by a working piston carried by a hollow piston rod and provided with valves. A piston pump is driven by the spring movements and pumps oil out of a low-pressure chamber into the working space connected to the high-pressure chamber and comprises a pump space formed by the hollow piston rod, a pump rod connected to the working cylinder, and a further pressure generator, which acts upon the damping medium.

2. Description of the Related Art

A prior art self-pumping hydropneumatic spring strut in which a damping medium is pumped into a working cylinder by a piston pump of the spring strut while the vehicle is being driven until the ride height of the vehicle is achieved is already known, for example, from German reference DE 196 35 880 Al. Once the correct ride height has been achieved, the working cylinder opens a bleed opening and, with the aid of a short circuit (bypass), the vehicle body is thus prevented from being raised further. These spring struts furthermore have devices which allow the vehicle body to be raised to its ride height while the vehicle is stationary by virtue of the ability to pressurize the damping medium in the pump space by another drive means. Once the appropriate valves have been opened, this drive element effects a pressure balance between the pump space and the working space connected to the high-pressure space, thus allowing the vehicle body to be raised while stationary without supplying oil, fluid or damping medium from an external reservoir.

Due to the way in which the nonreturn valves are incorporated into the design the pump space can only be acted upon by an external pressure generator from the outer end of the piston rod in such spring struts.

SUMMARY OF THE INVENTION

It is the object of the invention to develop a spring strut with internal leveling and a raising system which is effective when the vehicle is stationary in such a way that it is possible to provide a compact unit that is easy to install.

To achieve this object, the invention includes a high-pressure chamber and/or a working space of a working cylinder connected to the high-pressure space to be acted upon directly or indirectly by a pressure generator.

The pressure generator may be flanged to an external casing of the spring strut or the pressure generator may be at least partially integrated into the casing of the spring strut, thereby allowing certain components of the pressure generator to be fitted within the spring strut and other components to be fitted outside the spring strut. It is advantageous here if the pressure generator with its corresponding connections is provided in the vicinity of the high-pressure chamber or the working space connected to the high-pressure chamber.

For satisfactory control of the externally applied pressure by the further pressure generator, a further embodiment includes a first nonreturn valve leading from the pressure generator to the high-pressure chamber.

A further embodiment includes a second nonreturn valve leading from the low-pressure chamber to the pressure generator.

In an arrangement which is simple in terms of production, the pressure generator is arranged at the outer circumference of the working cylinder.

According to a further embodiment, the pressure generator includes a piston acted upon by a motor-driven eccentric. In this embodiment, an electric motor may be provided as the motor drive.

As an alternative, the pressure generator may also comprise a gear pump instead of a motor-driven eccentric and piston.

In yet another embodiment, the pressure generator may comprise an axially moveable piston acted upon by an electromagnet.

To provide an economical solution, a pressure generator according to the present invention may be connected to act on at least two spring struts.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
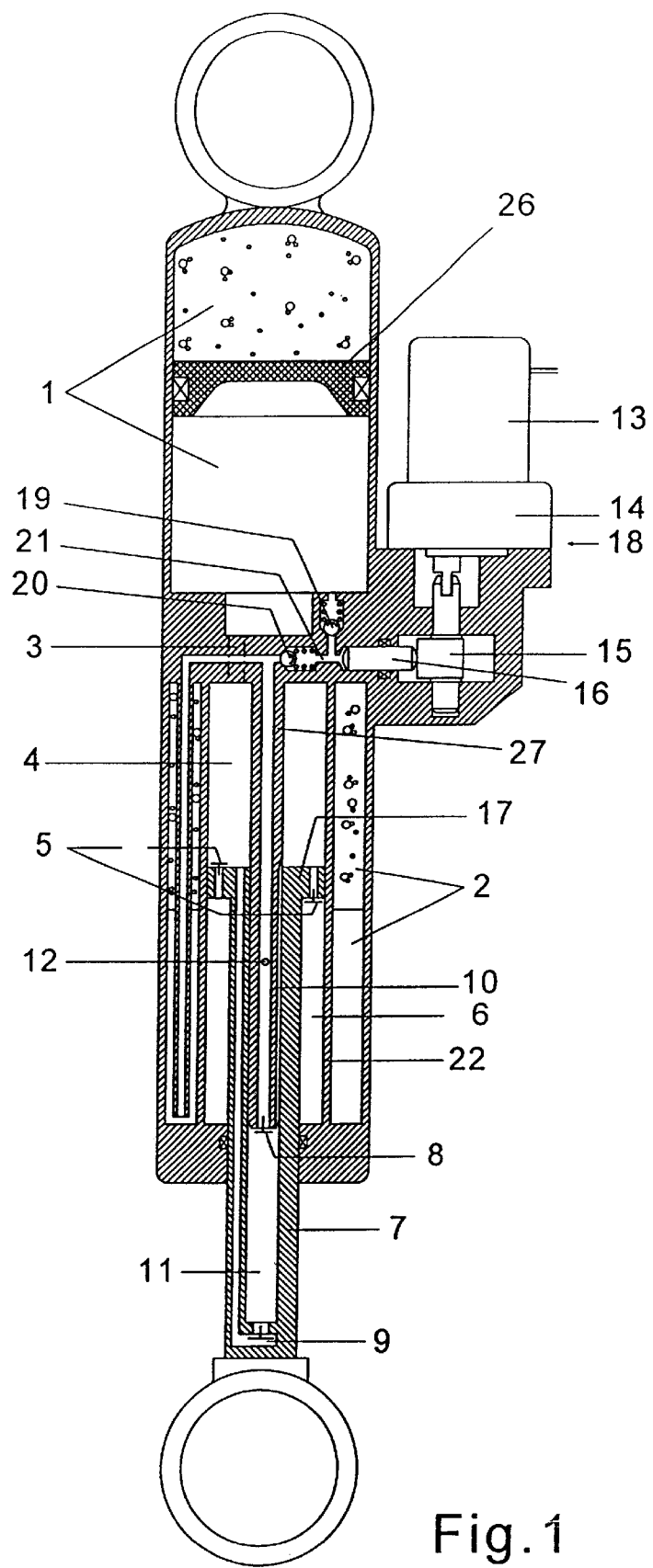
FIG. 1 is a longitudinal sectional view showing an embodiment of a self-pumping hydropneumatic spring strut with internal leveling according to the present invention.

A spring strut with internal leveling for motor vehicles according to an embodiment of the present invention is shown in FIG. 1 comprising a working cylinder 22 with a damping piston 17 axially movably inserted therein and connected at the end of a piston rod 7. The damping piston 17 divides the working cylinder 22 into an upper working space 4 and a lower working space 6. One end of the working cylinder 22 is closed off by a base and the other end of the working cylinder is closed by a cap through which the piston rod 7 passes to the outside in a sealed manner. The base and the piston rod 7 are fixed to the body of the vehicle and the axle of the vehicle, respectively, by fixing devices in a manner not shown. The working cylinder 22 is surrounded by a low pressure chamber 2 comprising an annular compensating chamber filled partially with oil and partially with gas. A high-pressure chamber 1 is connected at an end of the working cylinder 22 that opposes the piston rod 7. A separating piston 26 separates a gas in the high-pressure chamber 1 from a damping medium in the high-pressure chamber 1.

In the fully lowered state, i.e. when the system has not been pumped up, the pressure in the low-pressure chamber 2 is the same as the pressure in the high-pressure chamber 1. A pump rod 27 having a longitudinal discharge hole 12 is connected at an end of the working cylinder which faces the high pressure chamber 1 and projects into a pump space 11 which is in an internal cavity of the hollow piston rod 7. An inlet valve 8 is arranged at the end of the pump 20 rod 27 between the discharge hole 12 and the pump space 11 and an outlet valve 9 is arranged at the end of the pump space 11 opposing the end of the pump rod 27 in communication with the upper space 4 of the working cylinder 22. Damping valves 5 are arranged on the damping piston 17 between the upper working space 4 and the lower working space 6. Furthermore, a bypass 10 is arranged on the pump rod 27 for connecting the upper working space 4 with the pump space 11 when the piston rod extends to a predetermined extension position. The low-pressure chamber 2 is connected via the discharge hole 12, the inlet valve 8, the outlet valve 9 and the bypass 10 to the upper working chamber 4 and, from there, via the damping valves 5 to the lower working space 6. The pump space 11 is formed with the cavity in the piston rod 7 and the pump rod 27. As the vehicle is driven along, and the piston 17 is axially moved in the working cylinder 22, the pump rod 27 continuously pumps damping medium out of the low-pressure chamber 2 into the upper working space 4 until the bypass 10 establishes a connection between the upper working space 4 and the pump space 11 at the predetermined connection position.

While the vehicle is stationary, i.e. when the piston rod 7 is not moving relative to the working cylinder 22, the vehicle body would sink if the vehicle were loaded and the vehicle weight increased, with the piston rod 7 slowly entering the working cylinder 22. In this state, the vehicle body can only be raised by increasing the pressure in the upper and lower working spaces 4, 6 of the working cylinder 22. For this purpose, a pressure generator 18 is switched on. In FIG. 1, the pressure generator 18 comprises a drive 13 imparting a rotary motion to an eccentric 15 via a gear mechanism 14 and moving a piston 16 axially. This movement increases the pressure in a pumping chamber 21, causing a non-return valve 20 connected to the low-pressure chamber 2 to close and a non-return valve 19 connected to the high-pressure chamber 1 to open above a 20 certain pressure to thereby increase the pressure in the high-pressure chamber 1. This increased pressure in the high-pressure chamber 1 propagates into the upper and lower working spaces 4, 6 via a flow connection 3 and moves the damping piston 17 outwards relative to the working cylinder 22. If the pressure is continuously increased, the outward movement continues until the bypass 10 once again opens the connection between the upper working space 4 and the pump space 11, in which position the vehicle body is at a correspondingly desired level. The increase in pressure due to the pressure generator 18 causes an outward movement of the piston rod 7 without requiring an additional supply of damping medium.

Figure 2:
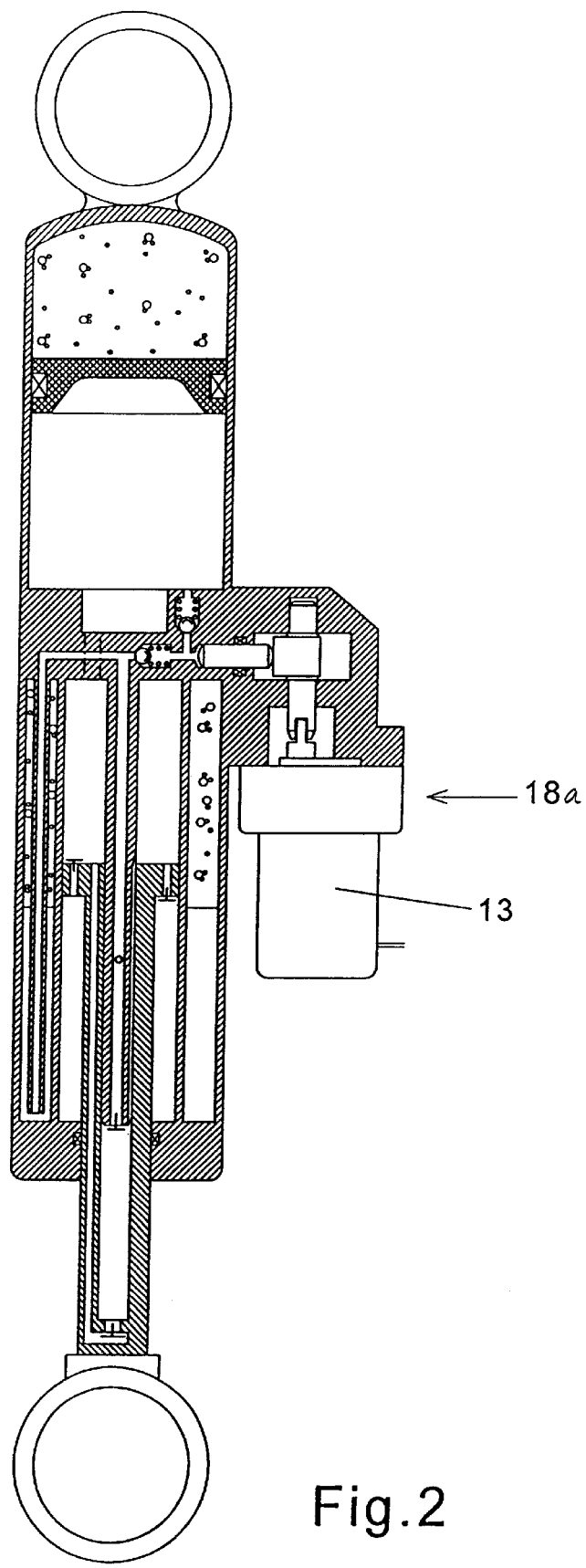
FIG. 2 is a longitudinal sectional view of another embodiment of the spring strut according to the present invention.

FIG. 2 shows another embodiment of the spring strut in which the pressure generator 18a, together with the drive 13 is arranged in such a way as to point downwards. In other respects, this embodiment of the pressure generator 18a corresponds to the principle already illustrated in FIG. 1.

Figure 3:
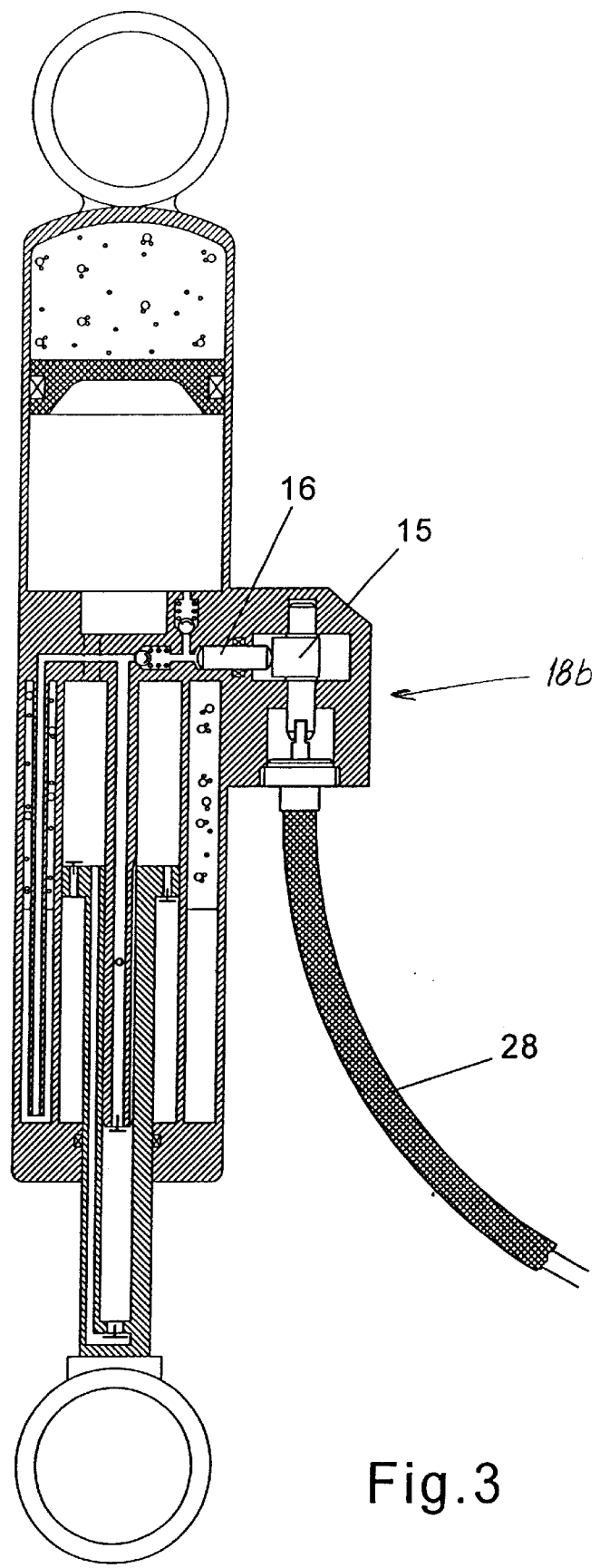
FIG. 3 is a longitudinal section view of a further embodiment of the spring strut of FIG. 1.

FIG. 3 illustrates an embodiment of the pressure generator 18b in which the eccentric 15 which acts on the piston 16 has rotation imparted to it directly by a flexurally elastic drive shaft 28 instead of the drive 13 of FIG. 1.

Figure 4:
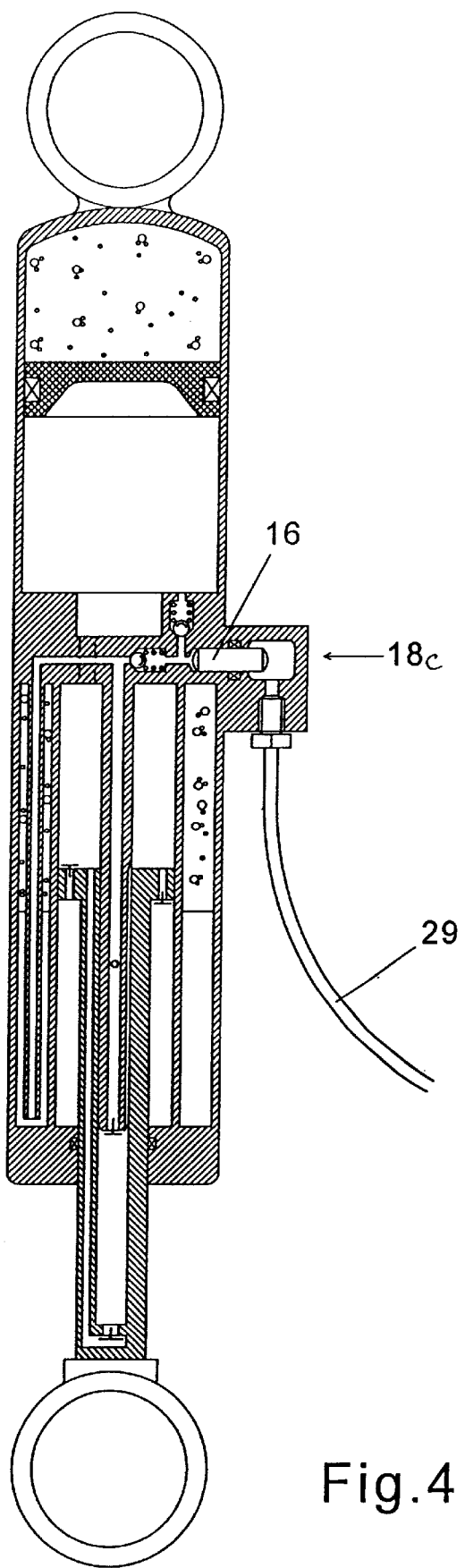
FIG. 4 is a longitudinal sectional view of another embodiment of a spring strut according to the present invention having a pressure generator for use with hydraulic pressurization.

FIG. 4 shows yet another embodiment of a pressure generator 18c in which the piston 16 is acted upon directly via a hydraulic line 29 without the interposition of a gear mechanism 14 or eccentric 15 of FIG. 1 in the region of the pressure generator 18c.

Figure 5:
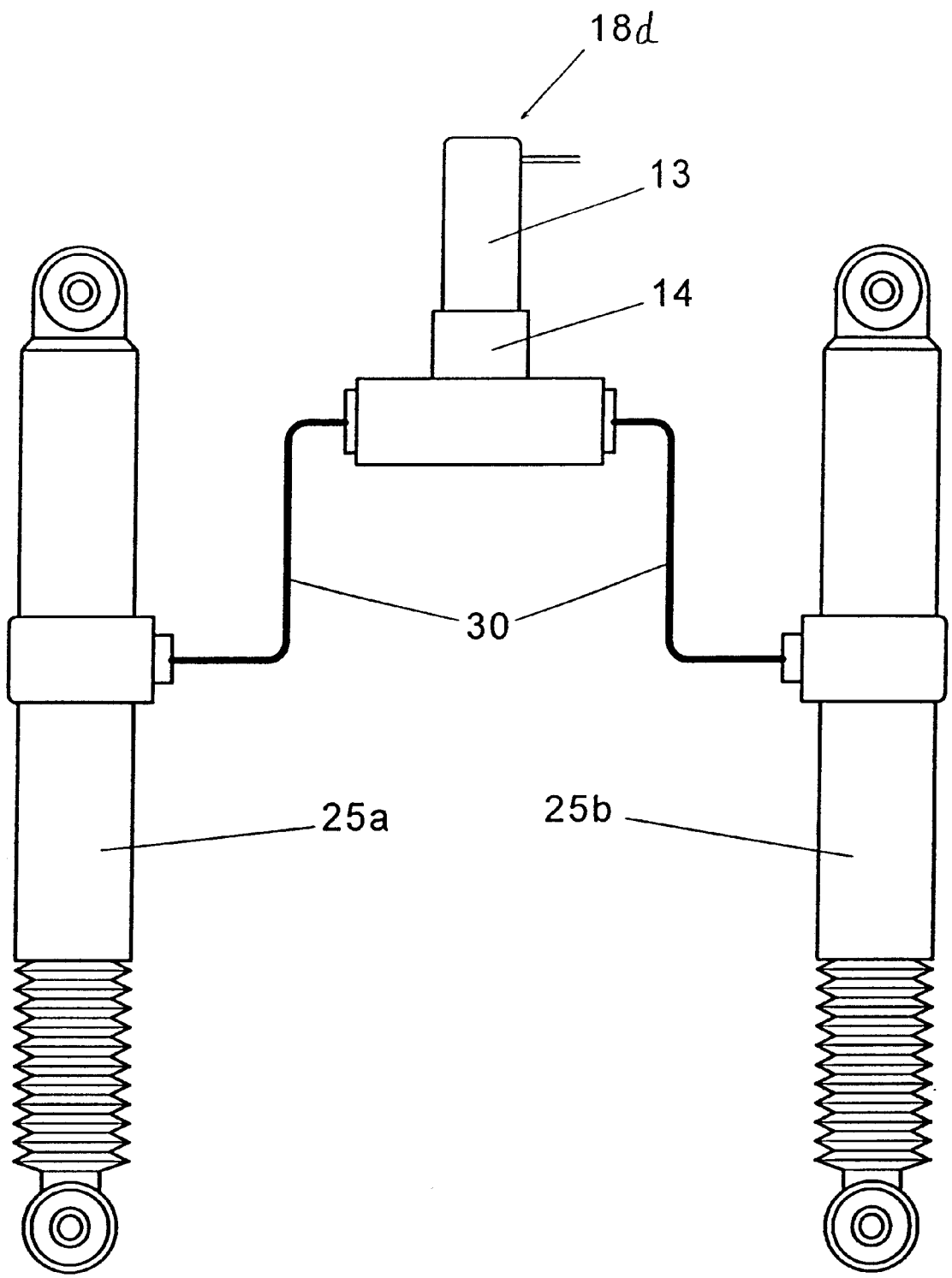
FIG. 5 is a longitudinal sectional view of another embodiment according to the invention of a pressure generator connected on two spring struts.

FIG. 5 shows a central pressure generator 18d which, once again, comprises a gear mechanism 14 and a drive 13 connected to two spring struts 25a and 25b via flow connections 30. Instead of the drive 13, it is also possible to use hydraulic drives as pressure generator 18c illustrated in FIG. 4, or to use the pressure generator 18b with the flexurally elastic drive shaft 28 illustrated in FIG. 3.

Figures 6, 6A:
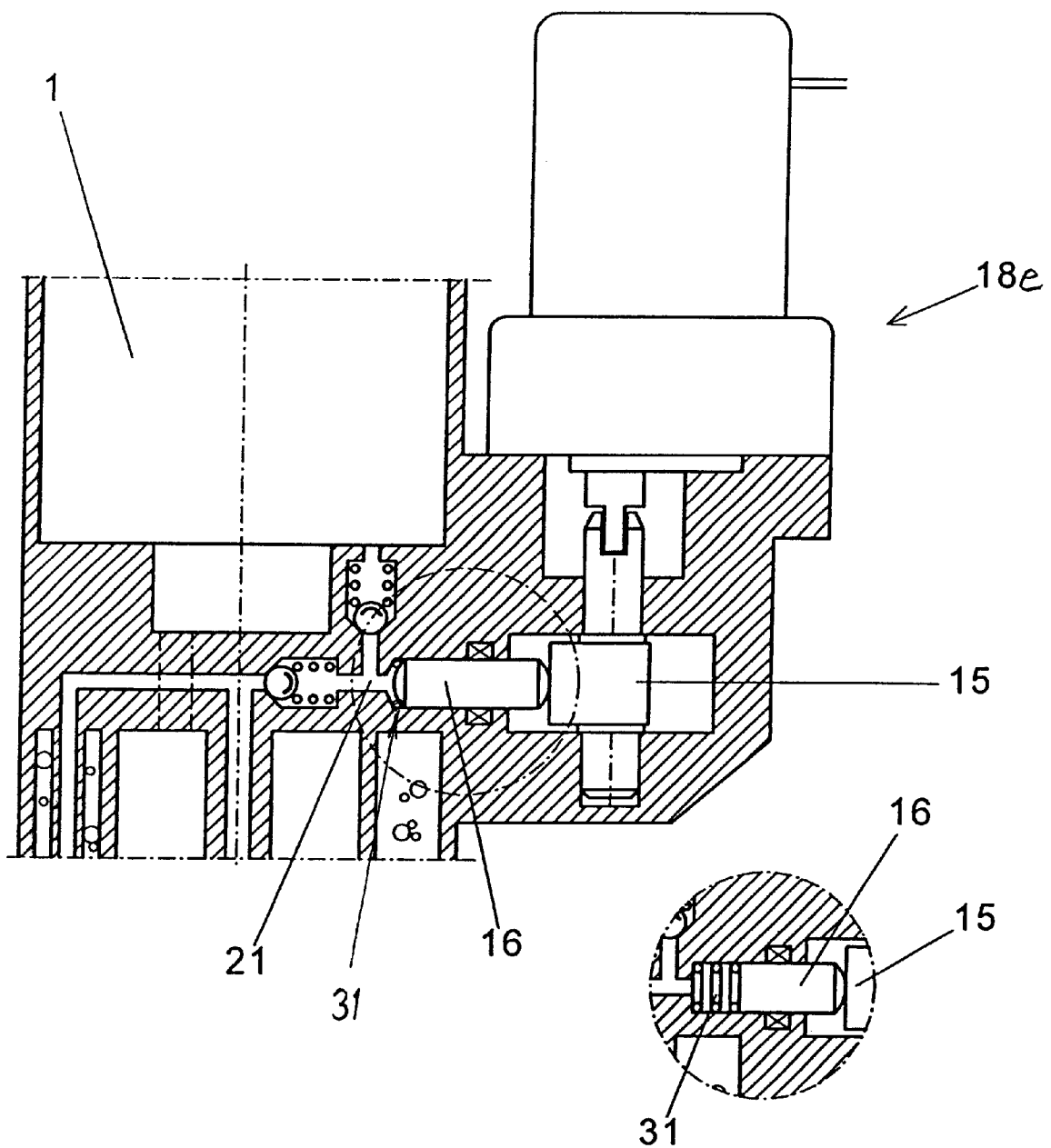
FIG. 6 is a partial longitudinal sectional view of another embodiment of a pressure generator in the region of the working cylinder of a spring strut.

FIGS. 6 and 6a show an embodiment of a pressure generator 18e of which the eccentric 15 acts upon the piston 16 to supply a corresponding pressure to the high-pressure chamber 1 from the pumping chamber 21. The detail shown in FIG. 6a shows that the piston 16 is additionally acted upon by a spring 31 which maintains continuous contact between the piston 16 and the eccentric 15. This is necessary particularly when, due to decreasing pressure in the pumping chamber 21, the piston 16 is not moved sufficiently toward the eccentric 15 by the hydraulic pressure.

Figure 7:
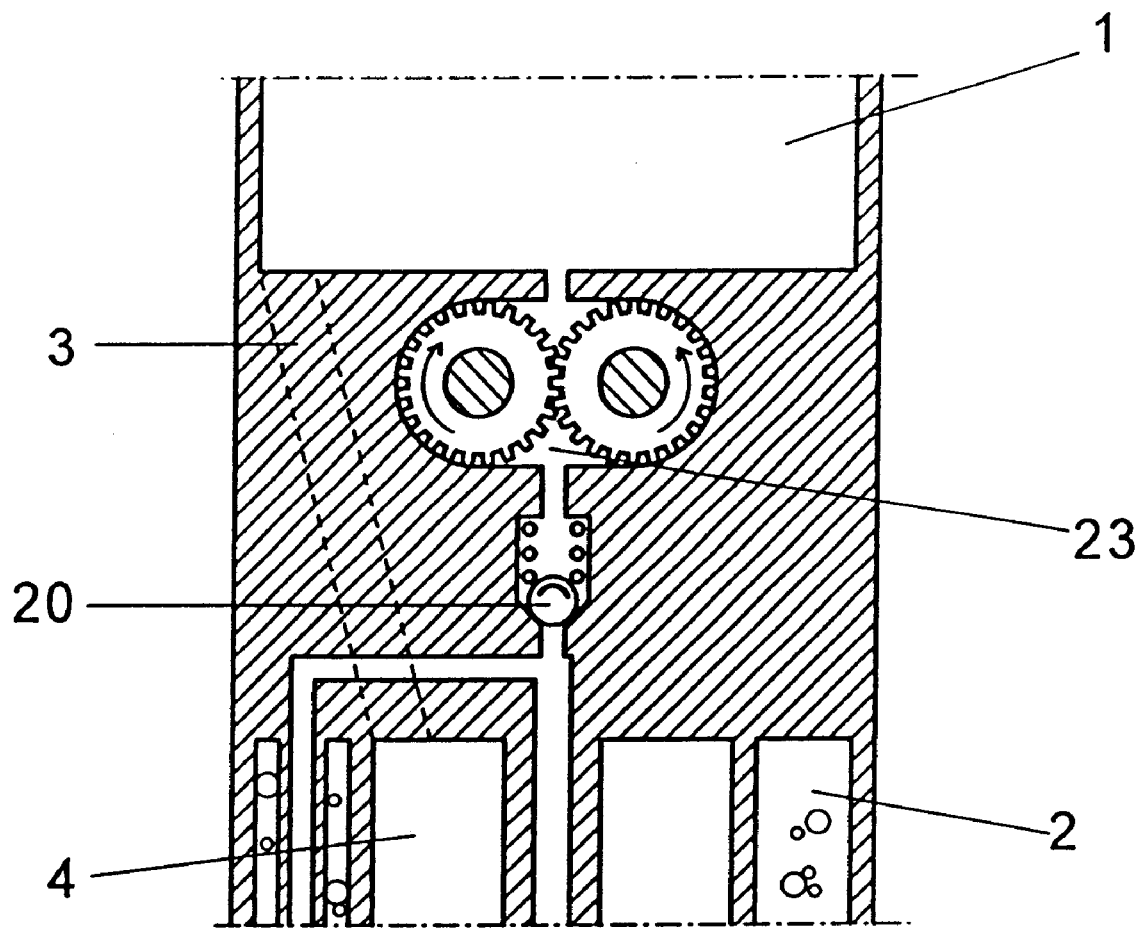
FIG. 7 is a partial longitudinal sectional view of another embodiment of a pressure generator.

FIG. 7 shows an integrated solution in which a gear pump 23 is arranged between the high-pressure chamber 1 and the low-pressure chamber 2 in the spring strut itself. This gear pump 23 pumps damping medium out of the low-pressure chamber 2 into the high-pressure chamber 1 via the non-return valve 20, with the result that, from there, the upper working space 4 is correspondingly supplied with high pressure via the flow connection 3.

Figure 8:
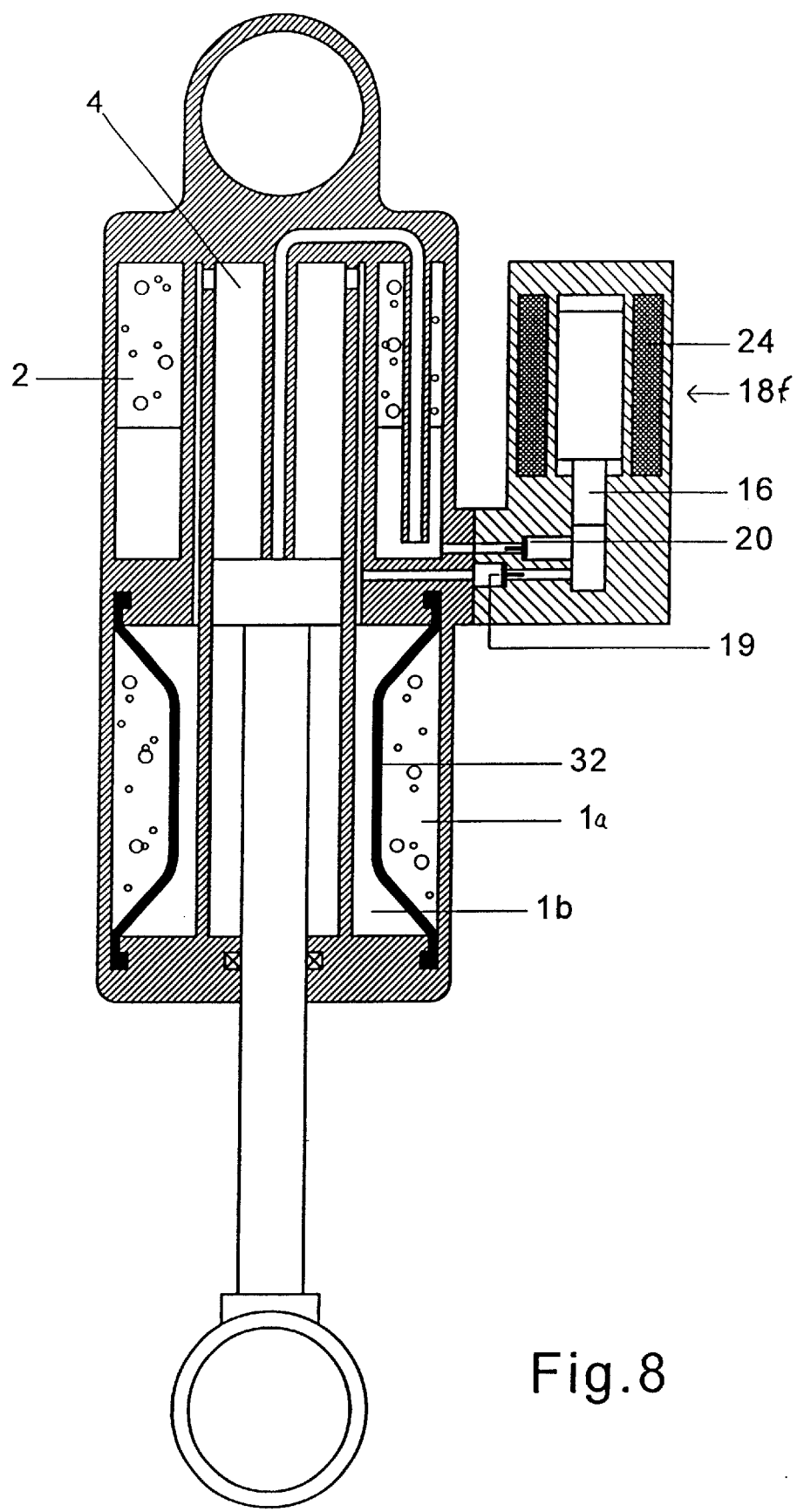
FIG. 8 is a partial longitudinal sectional view of another embodiment of a spring strut according to the present invention with a magnetically adjustable pressure generator.

FIG. 8 shows another embodiment, in which a first high-pressure chamber 1a is separated from a second high-pressure chamber 1b on the hydraulic side by a diaphragm 32. The low-pressure chamber 2 is once again connected to the pressure generator 18f via the non-return valve 20 while the piston 16 supplies the pressure directly into the upper working space 4 and high-pressure chamber 1b, bypassing the non-return valve 19.

In this embodiment, the pressure generator 18f comprises a piston 16 acted upon and moved axially by an electromagnet 24.

The invention is not limited by the embodiments described above which are presented as examples only but can be modified in various ways within the scope of protection defined by the appended patent claims.

We claim:

1. A self-pumping hydropneumatic spring strut with internal leveling for a motor vehicle, comprising:
   a working cylinder filled with a damping medium;
   a piston connected to a hollow piston rod and axially movably arranged in said working cylinder, said piston dividing said working cylinder into an upper working space and a lower working space and comprising valves between said upper working space and said lower working space;

a high pressure chamber comprising a gas cushion acting as a spring and connected with one of said upper working- space and said lower working space of said working cylinder such that said working cylinder is under the pressure of said gas cushion;

a low pressure chambers connected with a piston pump operatively arranged for pumping damping medium from said low pressure chamber into said one of said upper working space and said lower working space in response to movement of said piston in said working cylinder, said piston pump comprising a pump rod in said working cylinder and a pump space formed by said hollow piston rod and said pump rod in said hollow piston rod; and a pressure generator operatively connected for acting on a pumping chamber having first and second non-return valves, said pumping chamber being arranged between said high pressure chamber and said low pressure chamber, wherein said first non-return valve is arranged between said pumping chamber and sadi high-pressure chamber and allows only flow toward said high pressure chamber from said pumping chamber, and said second non-return valve is arranged between said low-pressure chamber and said pumping chamber and allows only flow toward said pumping chamber from said low-pressure chamber.

2. The spring strut of claim 1, wherein said pressure generator is arranged at an outer circumference of said working cylinder.

3. The spring strut of claim 1, wherein said pressure generator comprises an axially moveable generator piston and a motor-driven eccentric operatively connected for acting on said generator piston.

4. The spring strut of claim 3, wherein said pressure generator comprises an electric motor for driving said motor-driven eccentric.

5. The spring strut of claim 1, wherein said pressure generator comprises a gear pump.

6. The spring strut of claim 1, wherein said pressure generator comprises an axially moveable piston and an electromagnetic operatively connected for acting on said axially moveable piston.

7. The spring strut of claim 1, wherein said pressure generator is operatively connected for acting on a further spring strut.

* * * * *